3,763,134
TWO-PHASE SLURRY PROCESS FOR THE CHLORO-NITROSYLATION OF POLYMERS
Pauls Davis, Gibraltar, Mich., and Herwart C. Vogt, Ludwigshafen, Germany, assignors to BASF Wyandotte Corporation, Wyandotte, Mich.
No Drawing. Continuation-in-part of application Ser. No. 4,754, Jan. 21, 1970. This application Mar. 30, 1972, Ser. No. 239,720
Int. Cl. C08d 5/04
U.S. Cl. 260—93.7
8 Claims

ABSTRACT OF THE DISCLOSURE

Polymers can be readily chloronitrosylated in a two-phase slurry system employing fluorocarbons as the reaction medium. The resulting polymers may be cross-linked with heat to provide polymers having improved physical properties.

---

The subject application is a continuation-in-part of our copending U.S. patent application Ser. No. 4,754, filed Jan. 21, 1970.

The present invention relates to a process for the chloronitrosylation of polymers and to the products produced thereby. More particularly, the invention relates to a two-phase slurry process for the chloronitrosylation of polymers employing a fluorocarbon as the chloronitrosylating medium.

In our copending patent application Ser. No. 4,754, filed Jan. 21, 1970, we disclose the preparation of chloronitrosylated polymers by the reaction of polymers with nitrosyl chloride or chlorine and nitric oxide in the presence of a catalyst employing an inert reaction medium. The present application relates to the specific embodiment of the general invention disclosed in our aforementioned application in which fluorocarbons are employed as reaction medium in amounts such that a two-phase slurry process results.

In accordance with the present invention, chloronitrosylated polymers are prepared by a low-viscosity process which is easy to handle and provides a substantially pure product, i.e., without polymer degradation in easily recoverable form. Moreover, the chloronitrosylated polymers prepared in accordance with the present invention, upon cross-linking, yield polymers having improved physical properties.

As mentioned above, the process of the present invention is a two-phase slurry process which comprises contacting polymers with nitrosyl chloride or chlorine and nitric oxide in a fluorocarbon medium in the presence of a catalyst. The resulting chloronitrosylated polymer may be cross-linked upon treatment with heat to yield a polymer having improved physical properties. The polymers prepared in accordance with the present invention have a chlorine content of from 0.05% to 73% by weight and a nitrogen content of from 0.01% to 5% by weight.

Polymers which may be chloronitrosylated according to the present invention generally have a molecular weight from about 1000 to 1,000,000, preferably from about 10,000 to 150,00. The polymers may be completely saturated or they may contain residual, reactive ethylenic unsaturation or functional groups such as halogen atoms or carbonyl, carboxylic and hydroxyl groups. Representative polymers include polyolefins such as polyethylene, polypropylene, polybutylene, the higher polyalkylenes, and copolymers prepared from mixtures of olefins such as poly(ethylene-propylene); chlorinated polyolefins such as chlorinated polyethylene; polystyrenes such as polystyrene, poly(mehtylstyrene), poly($\alpha$-methylstyrene) and poly(styrenebutadiene); polybutadiene, polyisobutylene, chloroprene, butyl rubber, polysulfone and polyvinyl and polyvinylidene halides such as polyvinylchloride, polyvinylidene chlorine, polyvinylfluoride and polyvinylidenefluoride.

As mentioned above, the process of the present invention comprises reacting a polymer with nitrosyl chloride or chlorine and nitric oxide in the presence of a catalyst such as light, heat or a free-radical initiator. Representative free-radical initiators which may be employed in the preparation of the polymers of the present invention include any standard well-known, free-radical initiator, preferably peroxides such as hydrogen peroxide, t-butyl peroxide, di-t-butyl peroxide, benzoyl peroxide, tertiary butyl hydroperoxide and dicumyl peroxide, and azo compounds such as azobis(isobutyronitrile). Other peroxide initiators which may be employed in the present invention include cumene hydroperoxide, dichlorobenzoyl peroxide, tertiary butyl perbenzoate, acetyl benzoyl peroxide, caprylyl peroxide, lauryl peroxide, hydroxyheptyl peroxide, methyl ethyl ketone peroxide, 1-hydroxycyclohexyl hydroperoxide-1, ditertiary butyl perphthalate, dibenzaldiperoxide, 2,2-(tertiary butylperoxy)butane, bis(parabromobenzoyl)peroxide, bis(parachlorobenzoyl)peroxide, bis(succinyl)peroxide, and bis(chloroacetyl)peroxide, Reference is made to a book entitled, "Radical Polymerization," by J. C. Bevington (Academic Press, 1961), pages 5–28, for a detailed discussion of well-known free-radical initiators which may be employed in the present invention.

As mentioned above the process of the present invention involves chloronitrosylating a polymer in a fluorocarbon medium. Florocarbons which may be employed in the present invention are those aliphatic or cycloaliphatic hydrocarbons having from one to four carbon atoms and from four to ten halogen atoms providing that at least one halogen atom is fluorine. Representative fluorocarbons include tetrafluoromethane,
bromotrifluoromethane,
chlorotrifluoromethane,
dibromodifluoromethane,
dichlorodifluoromethane,
trichlorofluoromethane,
hexafluoroethane,
1,2,2-trichloro-1,1,2-trifluoroethane,
1,1,2,2-tetrachloro-1,2-difluoroethane,
1,2-dibromo-1,1,2,2-tetrafluoroethane,
1,2,2-tribromo-1,1,2-trifluoroethane,
octafluoropropane,
decafluorobutane,
hexafluorocyclopropane,
1,2,3-trichloro-1,2,3-trifluorocyclopropane,
octafluorocyclobutane-1,1,2-dichloro-1,2,3,4,4-hexafluorocyclobutane,
1,2,3,4-tetrachloro-1,2,3,4-tetrafluorocyclobutane.

The amount of fluorocarbon used in the present invention will vary depending upon the particular fluorocarbon employed and the molecular weight of the polymer. Generally, however, the concentration of polymer in fluorocarbon will be from 1% to 35% by weight solids, preferably from 5% to 15% solids.

The reaction of the present invention is generally carried out at a temperature between $-30°$ C. and $100°$ C., preferably between $-30°$ C. and $80°$ C. The particular temperature will depend upon the fluorocarbon diluent, the polymer and the initiator as well as other reaction conditions such as time and pressure employed. It is preferred to carry out the reaction under reflux conditions. The reaction may be carried out at atmospheric, superatmospheric or subatmospheric pressure. The time of the reaction will vary with the reactants employed and the temperature of the reaction. Generally, however, from one hour to sixty hours, preferably from one hour to twenty-four hours, will be sufficient to insure that the reaction has occurred.

After the chloronitrosylation is completed, the products prepared in accordance with the present invention are easily isolated by simple filtration techniques. The chloronitrosylated polymer may then be cured by heating to a temperature of from 80° C. to 225° C. Pressure may accompany the cure of the polymers. Generally, the cure is carried out in the presence of a filler such as carbon black and magnesium oxide and other basic oxides such as zinc, lead or calcium oxides. The cured polymers exhibit increased tensile strength, decreased elongation and insolubility in organic solvents.

The following examples ilustrate the invention. All parts are by weight unless otherwise indicated. In the examples which follow, the percent chlorine was determined by the Mohr Chlorine Procedure and the percent nitrogen was determined by the Dumas Nitrogen Procedure. The physical properties of the cured polymer were determined according to standard ASTM procedures.

EXAMPLE I

A glass reaction vessel equipped with a thermometer, stirrer, condenser and inlet and heat exchange means was charged with 3130 parts of 1,1,2-trichloro-1,2,2-trifluoroethane and 200 parts of polyethylene having a molecular weight of about 60,000, a melt index of 20 and a density of 0.915. The polyethylene had a high surface area which was achieved by dissolving 1000 parts of the polyethylene in 950 parts of hot carbon tetrachloride and then precipitating it by slowly adding the solution to approximately 8900 parts of vigorously stirred isopropanol. The fine crumb was dried to constant weight at 80° C. and 0.2 millimeter of mercury.

Under a nitrogen atmosphere the charge was heated to 48° C. at which temperature refluxing occurred. While maintaining the charge at this temperature 40 parts of nitrosyl chloride were passed through the reaction vessel in the presence of a quatrz Hanovia 500-watt lamp for a period of two hours. After the two-hour period in which nitrosyl chloride was added to the reactor, the reaction mixture was cooled to room temperature and the product was isolated by filtration and dried under ambient conditions to constant weight. Analysis of the fine, white, free-flowing product indicated 0.42% chlorine and 0.51% nitrogen.

The polymer prepared above was cured by heating to 300° F. for one hour. Films prepared from the cured polymer exhibited the following physical properties:

Tensile strength, p.s.i. _____ 1771
300% modulus _____ 1338
100% modulus _____ 1218
Elongation, percent _____ 365

The above procedure is duplicated with the exception that the reaction is carried out (a) in the presence of benzoylperoxide at 80° C. for 24 hours and (b) in the presence of azobis(isobutyronitrile) at 75° C. for 12 hours. In each instance, a product is obtained substantially as described and indicated above.

EXAMPLE II

A glass reaction vessel equipped with a thermometer, stirrer, condenser and inlet and heat exchange means was charged with 3130 parts of 1,1,2-trichloro-1,2,2-trifluoroethane and 200 parts of polyethylene having a melt index of 20 and a density of 0.915. The polyethylene had a high surface area which was achieved by dissolving 1000 parts of the polyethylene in 950 parts of hot carbon tetrachloride and then precipitating it by slowly adding the solution to approximately 8900 parts of vigorously stirred isopropanol. The fine crumb was dried to constant weight at 80° C. and 0.2 millimeter of mercury.

Under a nitrogen atmosphere the charge was heated to 48° C. at which temperature refluxing occurred. While maintaining the charge at this temperature 84 parts of nitrosyl chloride were introduced into the reaction vessel in the presence of a quartz Hanovia 500-watt lamp for a period of four hours. After the four-hour period in which nitrosyl chloride was added to the reactor, the reaction mixture was cooled to room temperature and the product was isolated by filtration and dried under ambient conditions to constant weight. Analysis of the fine, white, free-flowing product indicated 1.30% chlorine and 0.51% nitrogen.

The polymer prepared above was cured by heating to 300° F. for one hour. Films prepared from the cured polymer exhibited the following physical properties:

Tensile strength, p.s.i. _____ 1880
300% modulus _____ 1477
100% modulus _____ 1342
Elongation, percent _____ 378

EXAMPLE III

A glass reaction vessel equipped with a thermometer, stirrer, condenser and inlet and heat exchange means was charged with 3130 parts of 1,1,2-trichloro-1,2,2-trifluoroethane and 200 parts of polyethylene having a melt index of 20 and a density of 0.915. The polyethylene had a high surface area which was achieved by dissolving 1000 parts of the polyethylene in 950 parts of hot carbon tetrachloride and then precipitating it by slowly adding the soltuion to approximately 8900 parts of vigorously stirred isopropanol. The fine crumb was dried to constant weight at 80° C. and to 0.2 millimeter of mercury.

Under a nitrogen atmosphere the charge was heated to 48° C. at which temperature refluxing occurred. While maintaining the charge at this temperature 179 parts of nitrosyl chloride were passed through the reaction vessel in the presence of a quartz Hanovia 500-watt lamp for a period of nine hours. After the nine-hour period in which nitrosyl chloride was added to the reactor, the reaction mixture was cooled to room temperature and the product was isolated by filtration and dried under ambient conditions to constant weight. Analysis of the fine, white, free-flowing product indicated 1.84% chlorine and 0.70% nitrogen.

The polymer prepared above was cured by heating to 300° F. for one hour. Films prepared from the cured polymer exhibited the following physical properties:

Tensile strength, p.s.i. _____ 1516
100% modulus _____ 1250
Elongation, percent _____ 291
Yield point _____ 1178

EXAMPLE IV

A glass reaction vessel equipped with a thermometer, stirrer, condenser and inlet and heat exchange means was charged with 1565 parts of 1,1,2-trichloro-1,2,2-trifluoroethane and 200 parts of chlorinated polyethylene having a molecular weight of about 20,000, a chlorine content of 36% and a bulk density of 28 lbs./cu. ft.

Under a nitrogen atmosphere the charge was heated to 48° C. at which temperature refluxing occurred. While maintaining the charge at this temperature 53 parts of nitrosyl chloride were introduced into the reaction vessel in the presence of a quartz Hanovia 500-watt lamp for a period of two hours. After the two-hour period in which nitrosyl chloride was added to the reactor, the reaction mixture was cooled to room temperature and the product was isolated by filtration and dried under ambient conditions to constant weight. Analysis of the fine, white, free-flowing product indicated 36.3% chlorine and 0.81% nitrogen, The polymer prepared above was cured by heating to 300° F. for one hour. Films prepared from the cured polymer exhibited the following physical properties:

| | |
|---|---|
| Tensile strength, p.s.i. | 2395 |
| 300% modulus | 656 |
| 100% modulus | 361 |
| Elongation, percent | 645 |

Films prepared from the untreated chlorinated polyethylene exhibited the following physical properties:

| | |
|---|---|
| Tensile strength, p.s.i. | 974 |
| 300% modulus | 368 |
| 100% modulus | 227 |
| Elongation, percent | 707 |

EXAMPLE V

A glass reaction vessel equipped with a thermometer, stirrer, condenser and inlet and heat exchange means was charged with 1565 parts of 1,1,2-trichloro-1,2,2-trifluoroethane and 200 parts of chlorinated polyethylene having a molecular weight of about 20,000, a chlorine content of 36% and a bulk density of 28 lbs./cu. ft.

Under a nitrogen atmosphere the charge was heated to 48° C. at which temperature refluxing occurred. While maintaining the charge at this temperature 109 parts of nitrosyl chloride were passed through the reaction vessel in the presence of a quartz Hanovia 500-watt lamp for a period of six hours. After the six-hour period in which nitrosyl chloride was added to the reactor, the reaction mixture was cooled to room temperature and the product was isolated by filtration and dried under ambient conditions to constant weight. Analysis of the fine, white, free-flowing product indicated 36.7% chlorine and 0.92% nitrogen.

The polymer prepared above was cured by heating to 300° F. for one hour. Films prepared from the cured polymer exhibited the following physical properties:

| | |
|---|---|
| Tensile strength, p.s.i. | 1301 |
| 300% modulus | 984 |
| 100% modulus | 374 |
| Elongation, percent | 379 |

EXAMPLE VI

Following the procedure described in Example I, various experiments are carried out employing 120 parts of the polyethylene described in Example I. The polyethylene is chloronitrosylated by passing nitrosyl chloride through a two-phase slurry system employing various fluorocarbons under reflux conditions for a period of two hours. The fluorocarbons employed, amounts thereof and reaction temperatures are as follows:

(A) trichlorofluoromethane, 2950 parts, 24° C.
(B) trichlorofluoromethane, 1475 parts, 24° C.
(C) 1,1,2,2-tetrachloro-1,2-difluoroethane, 3268 parts, 93° C.
(D) 1,2-dichloro-1,1,2,2-tetrafluoroethane, 2284 parts, 4° C.
(E) 1,2-dibromo-1,1,2,2-tetrafluoroethane, 2500 parts, 47° C.
(F) dichlorodifluoromethane, 2292 parts, −30° C.

In each experiment, a product is obtained substantially as described and indicated in Example I.

EXAMPLE VII

A reaction vessel equipped as described in Example I was charged with 1565 parts of 1,1,2-trichloro-1,2,2-trifluoroethane and 120 parts of polypropylene powder having a melt flow index of 12 grams per ten minutes and a density of 0.904. Under a nitrogen atmosphere, the charge is heated to 48° C. at which temperature refluxing occurred. While maintaining the charge at this temperature, 60 parts of nitrosyl chloride is passed through the reaction vessel in the presence of a quartz Hanovia 500-watt lamp for a period of three hours. After the end of the three-hour period, the reaction mixture is cooled to room temperature and the product is isolated by filtration and dried under ambient conditions to constant weight. Analysis of the fine, while, free-flowing product indicates the presence of both chlorine and nitrogen.

EXAMPLE VIII

A glass reaction vessel equipped with a thermometer, stirrer, condenser and inlet and heat exchange means was charged with 391 parts of trichlorofluoromethane and 25 parts of chlorinated polyethylene having a molecular weight of about 20,000, a chlorine content of 36% and a bulk density of 28 lbs./cu.ft.

Under a nitrogen atmosphere the charge was heated to 24° C. at which temperature refluxing occurred. While maintaining the charge at this temperature two volumetric parts of nitrogen oxide and one volumetric part of chlorine were introduced into the reaction vessel in the presence of a quartz Hanovia 500-watt lamp for a period of 225 minutes. Thereafter, the reaction mixture was cooled to room temperature and the product was isolated by filtration and dried under ambient conditions to constant weight. Analysis of the fine, white, free-flowing product indicated 40.7% chlorine and 0.88% nitrogen.

The polymer prepared above was cured by heating (20 parts) to 300° F. for thirty minutes in the presence of two parts of carbon black and two parts of magnesium oxide. Films prepared from the cured polymer exhibited the following physical properties:

| | |
|---|---|
| Tensile strength, p.s.i. | 1992 |
| 300% modulus | 1583 |
| 100% modulus | 563 |
| Elongation, percent | 362 |

EXAMPLE IX

A glass reaction vessel equipped with a thermometer, stirrer, condenser and inlet and heat exchange means was charged with 600 parts of 1,1,2-trichloro-1,2,2-trifluoroethane and 25 parts of polystyrene having a specific gravity of 1.05, a tensile strength of 6000 p.s.i. and an elongation of 1.7%.

Under a nitrogen atmosphere and ambient conditions, five parts of nitrosyl chloride was introduced into the reaction vessel and the mixture was exposed to sunlight for a period of eight hours. Thereafter, the product was isolated by filtration and dried under ambient conditions to constant weight. Analysis of the fine, white, free-flowing product indicated 10.8% chlorine and 0.66% nitrogen.

EXAMPLE X

A glass reaction vessel equipped with a thermometer, stirrer, condenser, condenser and inlet and heat exchange means was charged with 600 parts of 1,1,2-trichloro-1,2,2-trifluoroethane and 25 parts of polyvinyl chloride having a specific gravity of 1.40 and in inherent viscosity of 1.20.

Under a nitrogen atmosphere and ambient conditions, five parts of nitrosyl chloride was introduced into the reaction vessel and the mixture exposed to sunlight for a period of eight hours. Thereafter, the product was isolated by evaporation of the diluent to constant weight. Analysis of the fine, free-flowing product indicated 55.6% chlorine and 0.05% nitrogen.

The embodiments of the invention in which an exclusive property or privilege is claimed are defined as follows:

1. A two-phase slurry process for the chloronitrosylation of a polymer selected from the group consisting of polyolefins, chlorinated polyolefins, polystyrenes, polybutadiene, polyisobutylene, chloroprene, butyl rubber, polysulfone, polyvinyl halides, and polyvinylidene halides which comprises contacting in the presence of a catalyst said polymer with nitrosyl chloride or chlorine and nitric oxide in a fluorocarbon having from one to four carbon atoms and from four to ten halogen atoms selected from the group consisting of fluorine, chlorine, and bromine providing that at least one halogen atom is fluorine, the amount of fluorocarbon being such that the concentration of said polymer in said fluorocarbon is from 1% to 35% by weight solids and the temperature of the chloronitrosylation being maintained between −30° C. and 100° C. so as to assure that chloronitrosylation is carried out in a two-phase slurry system.

2. The process of claim 1 wherein the fluorocarbon is 1,1,2-trichloro-1,2,2-trifluoroethane.

3. The process of claim 1 wherein the catalyst is light.

4. The process of claim 1 wherein the concentration of polymer in fluorocarbon is from 5% to 15% by weight solids.

5. The process of claim 1 wherein the polymer is a polyolefin.

6. The process of claim 5 wherein the polyolefin is polyethylene.

7. The process of claim 5 wherein the polyolefin is polypropylene.

8. A two-phase slurry process for the chloronitrosylation of polyethylene which comprises contacting polyethylene in a fluorocarbon with nitrosyl chloride in the presence of light, said fluorocarbon having from one to four carbon atoms and from four to ten halogen atoms selected from the group consisting of fluorine, chlorine, and bromine providing that at least one halogen atom is fluorine, the concentration of polyethylene in said fluorocarbon being from 1% to 35% by weight solids and the temperature of the chloronitrosylation being maintained between −30° C. and 100° C. so as to assure that chloronitrosylation is carried out in a two-phase slurry system.

References Cited

UNITED STATES PATENTS

| | | | |
|---|---|---|---|
| 964,517 | 12/1960 | Eck et al. | 260—94.9 H |
| 3,127,384 | 3/1964 | Sparks | 260—92.8 A |

OTHER REFERENCES

Copending Ser. No. 4,754 of applicants, filed Jan. 21, 1970.

JOSEPH L. SCHOFER, Primary Examiner

W. F. HAMROCK, Assistant Examiner

U.S. Cl. X.R.

260—79.3, 82.1, 92.3, 92.8 A, 93.5 A, 94.7 HA, N, 94.8, 94.9 H, 94.8, 96 HAL; 204—159.18